Aug. 7, 1923.
A. B. DODSON
TRAP
Filed Nov. 3, 1922
1,464,261
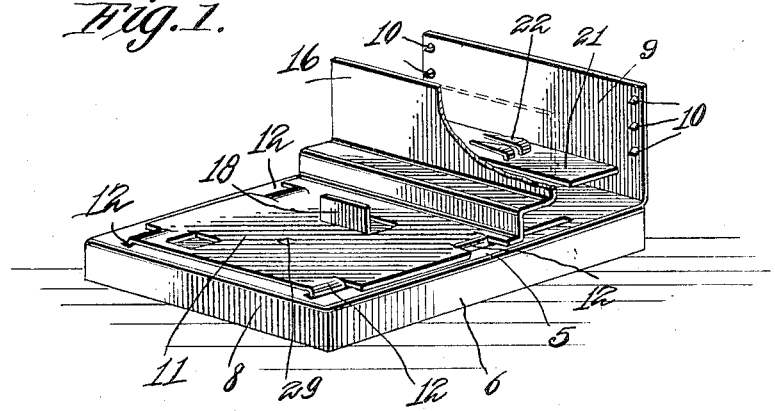
Fig. 1.
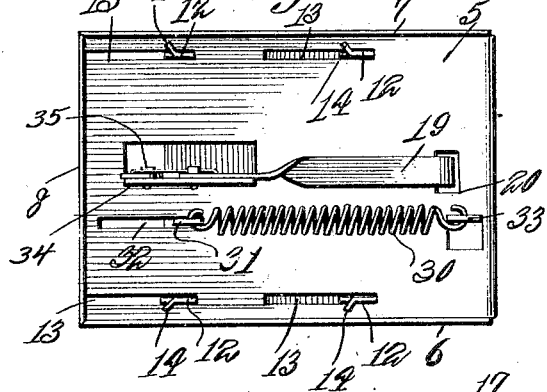
Fig. 2.
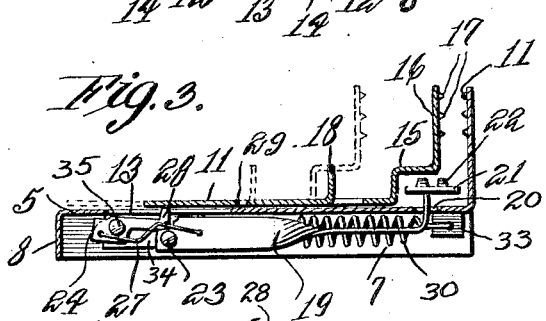
Fig. 3.
Fig. 4.
WITNESSES
Guy M Spring
Frank Fraser
Inventor
ARVY B DODSON.
By Richard B Owen.
Attorney Patented Aug. 7, 1923.

1,464,261

UNITED STATES PATENT OFFICE.

ARVY B. DODSON, OF LONGTON, KANSAS.

TRAP.

Application filed November 3, 1922. Serial No. 598,852.

*To all whom it may concern:*

Be it known that I, ARVY B. DODSON, a citizen of the United States, residing at Longton, in the county of Elk and State of Kansas, have invented certain new and useful Improvements in a Trap, of which the following is a specification.

The present invention relates to improvements in traps and particularly to the class of traps known as mouse traps.

An object of my invention is to provide a mouse trap that may be used either with or without bait.

A further object of my invention is to provide a mouse trap, that may be set and caused to be operated very easily and quickly.

A still further object of my invention is to provide a mouse trap that is simple, strong, durable and inexpensive in construction, and that is well adapted to the use for which it is designed.

Other objects and advantages of the invention will become apparent during the course of the following description.

In the drawings, wherein like numerals are employed to designate like parts throughout the same, Figure 1 is a perspective view of my device in an assembled condition showing a portion broken away for the purpose of illustration, Figure 2 is a bottom elevation of the same, Figure 3 is a longitudinal section taken through my invention, and Figure 4 is a detail of the trigger mechanism.

In the drawings, wherein for the purpose of illustration is shown a preferred embodiment of my invention, the numeral 5 designates the body portion of my trap, which is formed from a single piece of material, and which is bent down on its two sides and one end forming a base. The base comprises the two sides 6 and 7 and an end 8. The other end of the body portion 5 is bent upwardly, to form one of the jaws of the trap 9. Prong members 10 are formed on the inner side of the jaw 9 as will be more fully described hereinafter.

A slidable member 11 is adapted to be mounted on the body portion 5 by means of depending ears 12 which are formed integral with the slidable portion 11 and are adapted to be received within elongated slots 13 made in the body portion 5. The depending ears 12 terminate on the lower side of the body portion 5 in angular extensions 14, which prevent the depending ears 12 from becoming disengaged. The slidable portion is provided with a stepped portion 15, which terminates in the second jaw member 16 which is also provided with the sharpened projection members 17. Made integral with the slidable member 11, in any convenient place, is a cut out and bent up portion 18 which serves as a handle.

Formed near the rear end of the body portion 5 is a depending member 34 to which is adapted to be pivotally mounted a trigger member 19 which extends through opening 20 near the front end of the body portion 5 and terminates in a platform 21 on which are formed prongs 22 to receive the bait when it is deemed advisable to use bait in conjunction with my trap. The trigger member 19 is pivoted to the depending arm 34 by means of a bolt or the like 23. Pivoted to the other end of the depending member 34 by means of the bolt 35 is the other trigger member 24, which is provided with a notch 25 which is adapted to receive the projection 26 of the trigger member 19. A spring member 27 is connected between both trigger members to hold the same ordinarily in engagement. The trigger member 24 is provided with the upwardly extending finger 28 which is adapted to be received within a small opening 29 formed in the slidable member 11. A coiled spring member 30 is fastened to the depending lug 31, which is made integral with the slidable member 11 by cutting out a portion of 11 and bending it downwardly and which extends through the slot 32 in the body portion 5 and the other end of the coil spring 30 is connected to the depending lug 33 formed integral with the body portion 5. It will thus be seen that the jaws 9 and 16 are closed, due to the effect of the spring and it is only when the trigger mechanism is set that the jaws are held in spaced relation and held in such position until the platform 21 is touched and the trigger mechanism released thereby allowing the spring 30 to close the jaws.

It will thus be seen, that in operation the handle 18 is moved backwardly, thereby allowing the upwardly extending finger 28 to enter the opening 29 due to the effect of the spring 27, and the member 26 will be held in the notch 25. The platform 21 may be baited with suitable bait which is held by means of the prongs 22, and when the mouse touches the platform 21 the member 26 is disengaged from the notch 25, and the upwardly extending finger 28 is withdrawn from the opening 29 and the spring 30 quickly draws the jaw 16 close to the jaw 9. It will of course be understood that when the trap is set it will be in the position as is clearly shown in dotted lines in Fig. 3 of the drawing, and when the trap is sprung the jaws will be in a position as is clearly shown by full lines in the same figure. It is a well known fact that mice will walk along a room near to a wall, so if it is desired, the trap may be set along the wall, and the mouse will try to pass over the platform 21, thereby springing the trap and the mouse is caught. However, it is advisable to bait the trap as it is almost certain that the mouse will be tempted by the bait.

It is to be understood that the form of my invention herewith shown and described is to be taken as the preferred embodiment of the same, and that various changes in the shape, size, and arrangement of parts may be resorted to without departing from the spirit of my invention or the scope of the subjoined claims.

Having thus described my invention, what I claim is:—

1. A trap of the class described comprising a base portion, a jaw member made integral with said base portion, a second jaw member slidably mounted on said base portion, a depending member made integral with said base portion, a trigger member pivoted to said depending member, a platform carried by the other end of said trigger member and located between said jaws, a second trigger member pivoted to the other end of said depending member, and a spring connecting said trigger members.

2. A trap of the class described comprising a base portion, a jaw made integral with one end of said base portion, a second jaw member slidably mounted on the top of said base portion, a depending arm made integral with said base portion, trigger mechanism pivoted thereto, a platform carried by said trigger mechanism, and located between said jaws, and a coiled spring carried at one end by said movable jaw, and mounted at its opposite end to the under side of said base.

3. A trap of the class described comprising a base portion, said base portion being provided with a plurality of elongated slots, a jaw made integral with one end of said base portion, a jaw member having depending fingers which are adapted to be received within said elongated slots in said base, the ends of said depending fingers ending in angular extensions to prevent the displacement of said jaw, and means to operate said movable jaw on said base.

4. A trap of the class described comprising a base portion, a jaw fixed to one end of said base portion, a second jaw slidably mounted on said base portion, a depending arm made integral with said base, an arm pivoted to said depending arm, and extending through an opening in said base portion, a platform carried by said end and located between said jaws, a second pivoted arm mounted on said depending arm, a spring connecting to said pivoted arms, and a coil spring adapted to move said slidable jaw member.

5. A trap of the class described comprising a base portion, a jaw member made integral with said base portion, a second jaw member slidably mounted on said base portion, said slidable jaw member being provided with an aperture, a depending flange made integral with said base portion, a trigger member pivoted to one end of said depending flange, a platform carried by one end of said trigger member and located between said jaws, the opposite end of said trigger member being provided with a projection, a second trigger member pivoted to the other end of said depending flange and associated with the first mentioned trigger member, an upwardly extending finger carried by said second trigger member, and adapted for reception within the aperture in said slidable jaw, and a resilient member connected to said trigger members.

6. A trap of the class described comprising a base portion, said base portion being provided near one end with an elongated slot, a jaw member made integral with the opposite end thereof, a second jaw member slidably mounted on said base portion and being provided with an aperture, a depending flange made integral with the base portion, a trigger member mounted on the depending flange and extending through an opening in said base portion, a platform carried by the opposite end of the trigger member and located between said jaws, a second trigger member mounted on said depending flange, a spring connecting said pivoted trigger members, one of the trigger members being provided with a projection, a finger made integral with the other of said trigger members, said finger being adapted for reception within the aperture formed in said slidable jaw, the second trigger having a notch formed therein for the reception of the projection of the other trigger member, and a coil spring adapted to move said slidable jaw.

7. A trap of the class described comprising a base portion, said base portion having a plurality of slots, a jaw made integral with one end of said base portion, a jaw member having depending ears which are adapted to be received within said elongated slots in said base, the ends of said depending ears ending in angular extensions to prevent the displacement of said jaw, a depending flange made integral with said base, and trigger mechanism pivotally mounted on said depending flange, a depending lug carried by said second jaw, and spring means connected to said depending lug and said base portion, to slide said jaw on said base portion.

In testimony whereof I affix my signature in presence of two witnesses.

ARVY B. DODSON.

Witnesses:
W. A. CETT,
O. J. DEGARIMORE.